April 8, 1924.
R. H. WILKINSON
ADJUSTABLE GLARE SHIELD
Filed Aug. 4, 1921    2 Sheets-Sheet 1
1,489,407
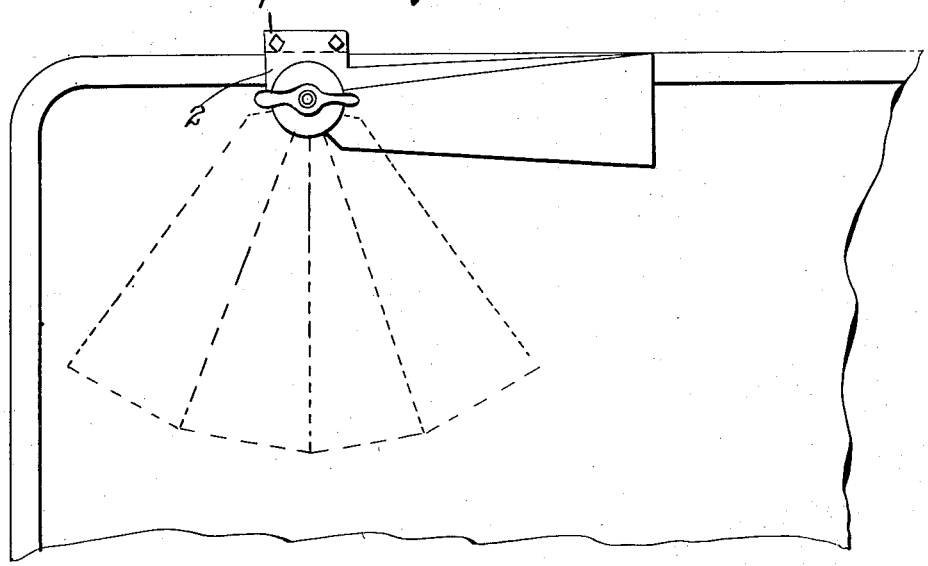
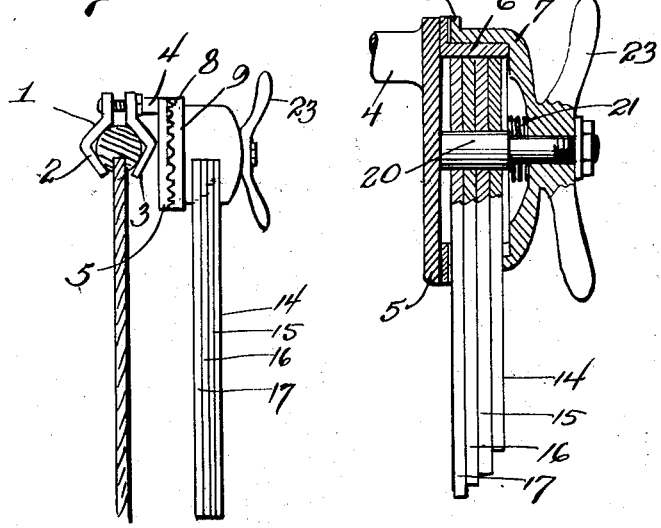 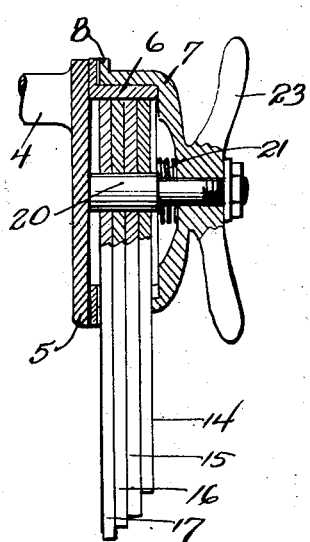
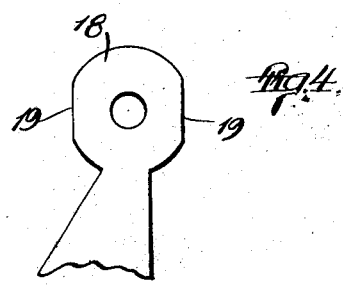
Inventor April 8, 1924.

R. H. WILKINSON

ADJUSTABLE GLARE SHIELD

Filed Aug. 4, 1921

Inventor

Patented Apr. 8, 1924.

1,489,407

UNITED STATES PATENT OFFICE.

ROBERT H. WILKINSON, OF PONCA CITY, OKLAHOMA.

ADJUSTABLE GLARE SHIELD.

Application filed August 4, 1921. Serial No. 489,756.

*To all whom it may concern:*

Be it known that I, ROBERT H. WILKINSON, a citizen of the United States, residing at Ponca City, in the county of Kay and State of Oklahoma, have invented certain new and useful Improvements in Adjustable Glare Shields, of which the following is a specification.

This invention relates to attachments to be supported on the front of automobiles to protect the driver from the glare of the headlights on approaching vehicles.

The primary object of the invention is to provide a collapsible shield which may be mounted upon the front of the vehicle in the line of vision of the operator of the vehicle so that the rays of light directed from the headlight of an approaching vehicle will be diffused or diminished in strength so that the driver's vision will not be impaired.

Another object of the invention is to provide an apparatus of this character which may be mounted in position on the shield and which may be quickly moved into operative or inoperative position at the desire of the operator.

Other objects of the invention will appear upon consideration of the following detail description and accompanying drawings, wherein:—

Figure 1 is a view of a fragmentary portion of a windshield showing the invention mounted thereon, the full lines indicating the position of the parts when the device is not in use, the dotted lines indicating the position of the parts when the device is being used.

Figure 2 is an edge elevation,

Figure 5:
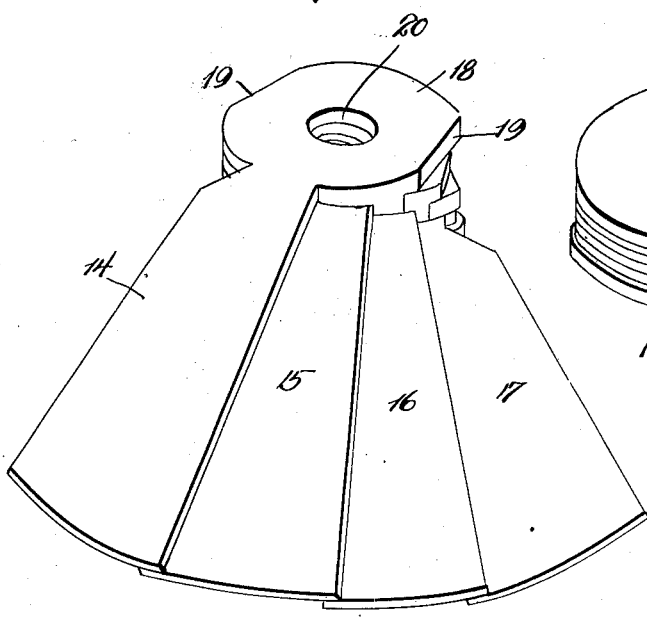
Figure 6:
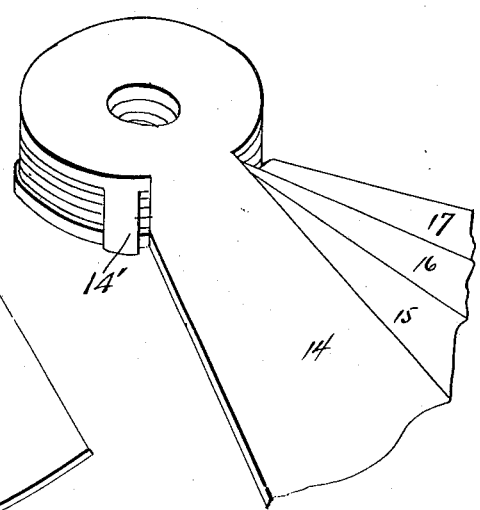
Figure 7:
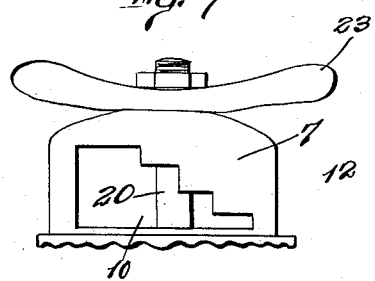
Figure 9:
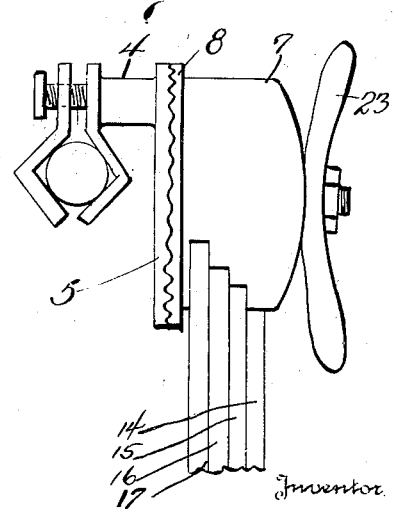
Figure 8:
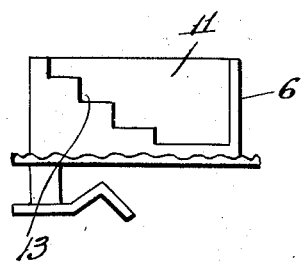

Figure 3 is a cross section through the housing containing the ends of the shield members, Figure 4 is a detail view of one end of one of the shield members, Figure 5 is a perspective view illustrating the manner of assembling the shield members, Figure 6 is a similar view illustrating a method of arranging the shield members in assembled relation, Figure 7 is a side elevation of the outer housing member, Figure 8 is a side elevation of the inner housing members, and Figure 9 is an enlarged side elevation of the two housing members assembled and showing their manner of being mounted in position.

Referring to the drawing by numerals, the bracket 1 may be of any preferred type as it will be understood that the device will be slightly modified to permit it to be mounted upon various types of automobiles such as those having framed wind shields and those having windshields without frames and also upon closed cars or limousines. In the present illustration the bracket includes the gripping members 2 and 3 which are adapted to engage the frame of the windshield as shown. The member 3 of the bracket is connected by a stud 4 to the base plate 5 of the inner casing 6, the latter being adapted to fit into the outer casing 7, the two casings telescoping as illustrated. The inner casing 6 is provided with an annular flange, and the outer casing is also provided with an annular flange 8 and the meeting faces of the two flanges are corrugated as indicated at 9 so that the corrugations may engage each other to maintain the two casings in relatively close relation when the apparatus is in use.

As shown in Figs. 7 and 8 of the drawing, the two casings are provided with side openings 10 and 11, each having one vertical edge straight, while the opposite vertical edge is notched as indicated at 12 and 13. A plurality of segmental shield members 14, 15, 16 and 17 are adapted to be mounted in the casing and extend through the openings 10 and 11. These members are constructed of glass or other similar material which will diminish the glare from the headlights of an approaching automobile. Each member consists of a segmental plate substantially in the form of a semaphore attached to a substantially circular disk 18. The disks 18 are arranged in superposed relation within the casing 11 and they have diametrically opposite flat portions 19 whereby they may be readily inserted through the widest portions of the openings 10 and 11.

A central opening in each of the disks 18 permits a bolt 20 to be inserted centrally through the housing, the outer end projecting through the outer end of the outside casing as shown. A coil spring 21 is interposed between the end of the casing and the adjacent disk 18 to maintain the disks in proper relation with respect to each other. It is to be noted that the outside end of the outer casing is provided with a handle member 23 whereby the casing may be turned to permit the operator to move the disks 14, 15, 16 and 17 into or out of operative position. It will be noted that the openings 10 and 11 are arranged so that the notched portions 12 and 13 will permit the segmental semaphores to be moved into assembled relation as shown in Fig. 1 by the full lines by means of the lug 14' carried by the edge of the disk 18, an extra means of precaution is provided, serving to assist the closing of the semaphores, thereby relieving the outer casing of the strain which it would ordinarily bear during this operation, or in operative position as shown by the dotted lines thus placing the disks in the line of vision of the operator to avoid the glare which will thereby permit the operator to more readily observe the direction of movement of the vehicle he is guiding.

Minor changes may be made in the details of construction without departing from the spirit of the invention or the scope of the claim hereunto appended.

What is claimed is:—

A device of the character described comprising a supporting bracket, a stationary housing mounted upon the supporting bracket, an outer casing telescoping the stationary casing, each of the said casings provided with side openings having opposed straight edges, and opposite notched edges, a series of segmental semaphores of transparent material disks attached to the semaphores and mounted within the said casings, the said semaphores projecting through the said openings and adapted to be engaged by the notched edges of the said openings when the outer casing is turned to move the said semaphore to operative or inoperative position, the said housing having a central pivot member passing through the said disks, a handle member to turn the said housing member mounted on the outer housing, and spring means engaged with the outer end of the outside housing to press the series of disks into assembled relation within the inner housing.

In testimony whereof, I have affixed my signature in the presence of two witnesses.

ROBERT H. WILKINSON.

Witnesses:
IKE M. BENTLEY,
C. H. HOLLAWAY.